United States Patent
Torres et al.

(10) Patent No.: US 11,055,527 B2
(45) Date of Patent: Jul. 6, 2021

(54) SYSTEM AND METHOD FOR INFORMATION EXTRACTION WITH CHARACTER LEVEL FEATURES

(71) Applicant: INTUIT INC., Mountain View, CA (US)

(72) Inventors: Terrence J. Torres, Mountain View, CA (US); Homa Foroughi, Edmonton (CA)

(73) Assignee: INTUIT INC., Mountain View, CA (US)

(*) Notice: Subject to any disclaimer, the term of this patent is extended or adjusted under 35 U.S.C. 154(b) by 64 days.

(21) Appl. No.: 16/265,519

(22) Filed: Feb. 1, 2019

(65) Prior Publication Data
US 2020/0250417 A1   Aug. 6, 2020

(51) Int. Cl.
G06K 9/00   (2006.01)
G06F 40/295   (2020.01)
G06K 9/62   (2006.01)

(52) U.S. Cl.
CPC ....... *G06K 9/00469* (2013.01); *G06F 40/295* (2020.01); *G06K 9/6217* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 9,984,471 B2* | 5/2018 | Becker | G06K 9/00449 |
| 10,354,134 B1* | 7/2019 | Becker | G06K 9/00986 |
| 10,395,772 B1* | 8/2019 | Lucas | G16H 10/60 |
| 2012/0036130 A1* | 2/2012 | Light | G06F 40/295 707/736 |
| 2019/0303727 A1* | 10/2019 | Foroughi | G06K 9/6267 |
| 2020/0004815 A1* | 1/2020 | Weisberg | G06K 9/00469 |
| 2020/0042645 A1* | 2/2020 | Douthit | G06F 16/93 |

FOREIGN PATENT DOCUMENTS

| CN | 108959349 | * 12/2018 |
|---|---|---|
| CN | 109271631 | 1/2019 |

OTHER PUBLICATIONS

Character-Based LSTM-CRF with Radical-Level Features for Chinese Named Entitiy Recognition. Dong et al. Dec. 2016.*
Chinese Named Entity Recognition Based on CNN-BiLSTM-CRF. Jia et al. Nov. 2018.*
International Search Report issued in PCT/US2019/043776 dated Oct. 29, 2019.
Written Opinion issued in PCT/US2019/043776 dated Oct. 29, 2019.
Yaozong Jia et al., "Chinese Named Entity Recognition Based on CNN-BiLSTM-CRF", 2018 IEEE 9th International Conference on Software Engineering and Service Sicence (ICSESS), IEEE, pp. 1-4, Nov. 23, 2018.
J. Baek, "Fast Document Rectification and Enhancement", Dropbox, Aug. 16, 2016, 11 pages.

(Continued)

*Primary Examiner* — Delomia L Gilliard
(74) *Attorney, Agent, or Firm* — DLA Piper LLP (US)

(57) ABSTRACT

A system and method for information extraction character level features. The system and method may be used for data extraction for various types of content including a receipt or a tax form.

20 Claims, 11 Drawing Sheets

(56) References Cited

OTHER PUBLICATIONS

C. Dong et al., "Character-Based LSTM-CRF with Radical-Level Features for Chinese Named Entity Recognition", NLPCC-ICCPOL, 2016, pp. 239-250.
Z. Huang et al., "Bidirectional LSTM-CRF Models for Sequence Tagging", arXiv:1508.01991v1, Aug. 9, 2015, 10 pages.
D. Kingma et al., "ADAM: A Methodfor Stochastic Optimization", arXiv:1412.6980v9, Jan. 30, 2017, 15 pages.
B. Lin et al., "Multi-Channel BilSTM-CRF Model for Emerging Named Entity Recognition in Social Media", Proceedings of the 3rd Annual Workshop on Noisy User-Generated Text, Sep. 7, 2017, pp. 160-165.
A. Newell et al., "Stacked Hourglass Networks for Human Pose Estimation", arXiv:1603.06937v2, Jul. 26, 2016, 17 pages.
Y. Pai et al., "Adaptive Thresholding Algoritm: Efficient Computation Technique Based on Intelligent Block Detection for Degraded Document Images", Pattern Recognition, vol. 43, Issue 9, Sep. 10, 2010, pp. 3177-3187.
Sauvola et al., "Adaptive Document Image Binarization", Patter Recognition vol. 33, (2000), pp. 225-236.
Y. Xiong, "Fast and Accurate Document Detection for Scanning", Dropbox, Aug. 9, 2016, 9 pages.

\* cited by examiner

SYSTEM AND METHOD FOR INFORMATION EXTRACTION WITH CHARACTER LEVEL FEATURES

BRIEF DESCRIPTION OF THE FIGURES

FIG. 5 illustrates an example of the structured data for a receipt generated by the system.

DETAILED DESCRIPTION OF SEVERAL EMBODIMENTS

Today, people receive many different pieces of content from many sources (e.g., PDF files, mobile document images, etc.) and it is desirable to be able to derive structured data from the different documents in a process known as document understanding. The structured data may be used in various downstream processes, such as tax calculations, tax return preparations, accounting and any other process in which it is desirable to be able to insert structured data into a database.

Figure 1:
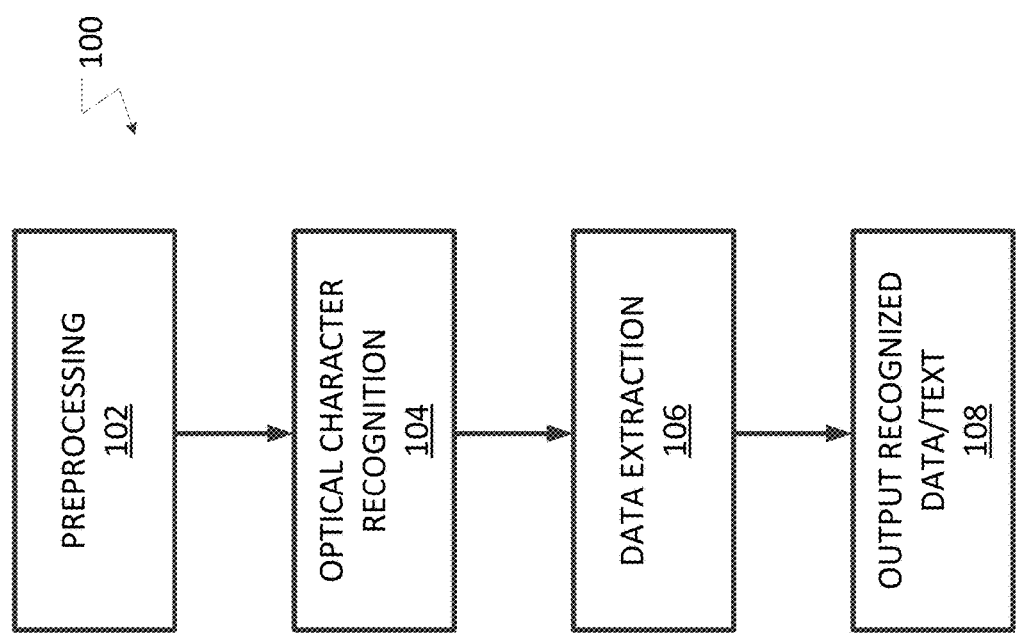
FIG. 1 illustrates a document understanding process that may include an information extraction process.

FIG. 1 illustrates a document understanding process 100 that may include an information extraction process. While method 100 is disclosed as particularly being applicable to an image of a piece of content and the piece of content may be a receipt/invoice or a tax form, the method may be used to understand the contents of any type of document or piece of content in which it is desirable to be able to extract structured data from the piece of content. During the document understanding method, a preprocessing 102 may be performed in which an image of the incoming piece of content may be analyzed and processed to improves the later extraction of information from the piece of content. For example, the preprocessing may include contrast enhancement of the image of the piece of content, cropping of the image of the piece of content and skew rectification of the image of the piece of content. The method 100 may perform an optical character recognition process (104) in which the information and alphanumeric characters in the piece of content are recognized. The method 100 may use any known or yet to be developed optical character recognition process (including using commercially available optical character recognition products). The optical character recognition process 104 may generate various information and data about the piece of content including information about a structure of the piece of content and information about the alphanumeric characters that appear in the piece of content. For example, for a receipt, the optical character recognition process may generate data about the location of certain alphanumeric characters, bounding boxes for certain alphanumeric characters and values for each of the alphanumeric characters that appear in the receipt. The information and data about the piece of content from the optical character recognition process may be noisy in that it contains errors that make the information and data about the piece of content from the optical character recognition process unsatisfactory for use in other data processing methods and techniques.

The various information and data about the piece of content from the optical character recognition process may be input into a data extraction process 106 in which extracted digital data corresponding to the piece of content is generated and output (108). The extracted digital data may be "cleaned" in that various processes are used to clean up the "noisy" information and data about the piece of content. For example, the data extraction process may include a process of named entity recognition information extraction with character level features that is described in more detail below.

Figure 2:
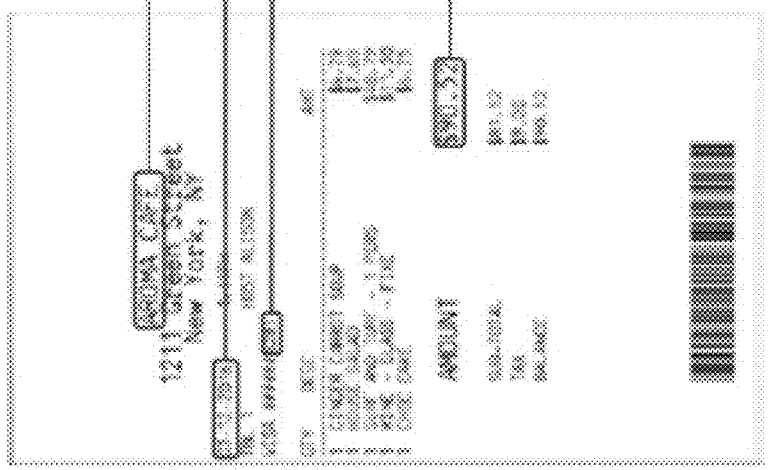
FIG. 2 illustrates an example of an invoice being processed using the document understanding process.

FIG. 2 illustrates an example of a receipt 200 that has been subjected to the document understanding process that includes the information extraction. The processes 102-106 are performed on the receipt and the data extracted from the piece of content (for example, a vendor name, a date of the receipt, the last four digits of the credit card and the total amount of the receipt) are output (108) and may be used for various other processes. For example, as shown in FIG. 2, the data extracted from a receipt/invoice or tax form may be used to match to transaction that may be part of a tax determining/tax planning process or loaded in a database, for example. However, it should be noted that the disclosed system and method is not limited to any particular process being performed once the data is extracted for the piece of content.

Figure 3:
FIG. 3 illustrates an example of the translation errors in words caused by an optical character recognition process.

A named entity recognition (NER) process is a known machine learning technique that is used to extract information from each piece of content where a predictive model is used to identify the portions of text corresponding to known entities of interest. Known NER methods are trained to operate at the word level and identify words or sequences of words belonging to the same entity. However, these known NER methods cannot be used for the types of pieces of content described above. Specifically, the types of pieces of content are a text stream generated from an image run though an optical character recognition process as shown in FIG. 1 that introduces character-level translation errors. For example, as shown in FIG. 3 for a receipt, the optical character recognition process introduces word level errors such as "T0t4l" instead of "Total", "S31.A9" instead of "$31.49" for the total amount of the receipt, "V1sa" instead of "VISA" and "3C69" instead of "3569" for the credit card number. These character-level translation errors would cause the known NER methods to expand their set of known entities too much (since each misspelled word may be interpreted as another known entity) and thus known NER methods cannot be utilized since these known systems would be unable to extract the desired structured data.

Figure 4:
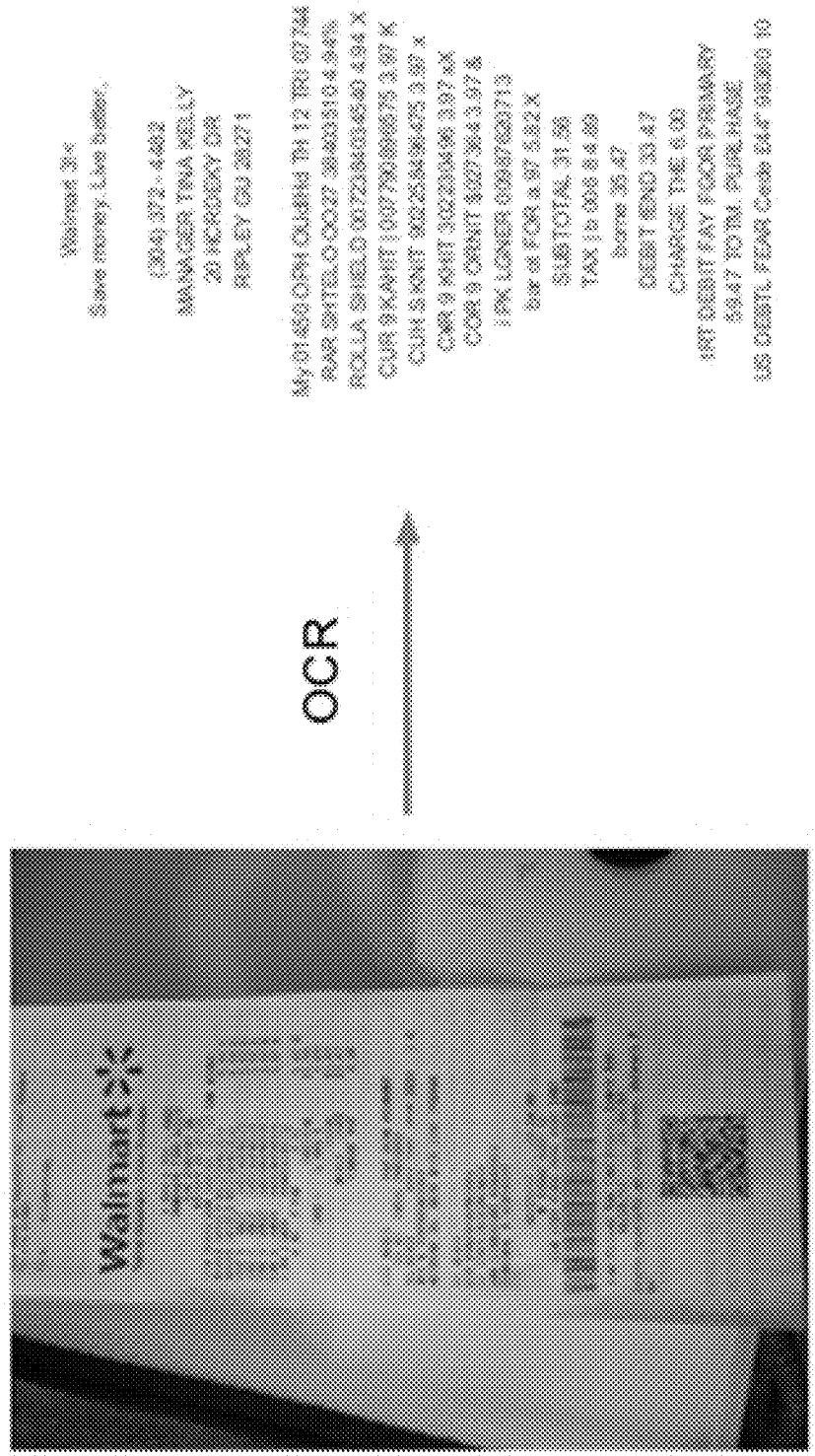
FIG. 4 illustrates an example of an output of the optical character recognition process from which data is extracted using the information extraction process.

FIG. 4 illustrates an example of an output of the optical character recognition process for a receipt from which data can be extracted using the novel information extraction process. As shown in FIG. 4, the output of the optical character recognition process is digital data corresponding to the receipt, but the digital data is unstructured and likely has transaction errors. For example, the digital data output from the optical character recognition process does not reveal certain pieces of structured data (such as a vendor name, a date of the receipt, the last four digits of the credit card and the total amount of the receipt) that may be used in other processes as shown in FIG. 2. In addition, the optical character recognition process introduces errors in the text that complicates the process to extract the structured data. In general, the optical character recognition process output may include a tag associated with each piece of text. It is desirable to be able to extract structured data from the optical character recognition process output wherein the structured data, in one embodiment, may include a key and a value (a key value pair) for each piece of structured data. For example, a piece of extracted data may be (vendor, Walmart) where the key indicates that the data contains information about a vendor and the value is the name of the particular vendor for this particular invoice. Therefore, each piece of structured data is extracted from the unstructured data output from the optical character recognition process using the named entity recognition information extraction with character level features.

The novel named entity recognition information extraction with character level features process receives the optical character recognition process and generates the key-value pairs of structured data. The novel process may be used for any piece of content, but particularly for invoices/receipts, examples of which are shown in FIGS. 2-3, and for tax forms. FIG. 5 illustrates an example of the structured data for a receipt wherein the structured data includes a vendor store name, a total amount, credit card digits and a transaction date that may be used for various other processes. The input piece of content for the novel named entity recognition information extraction with character level features process may be an image of the receipt or an tax form and may originate from an image captured by a client device using the camera of the client device. In an embodiment in which data is being extracted from a receipt, character level entities are extracted using a named entity recognition information extraction with character level features process. In an embodiment in which data is being extracted from a tax form, character level entities are extracted using the named entity recognition information extraction with character and word level features process because a tax form has a predefined layout/format and boxes that can be used during the data extraction process. It should be noted, however, that for any piece of content, the named entity recognition information extraction process may employ just character level entity extraction, just word level entity extraction and/or both character and word level entity extraction. Furthermore, for each different piece of content, such as a receipt or a tax form, different entities are identified and different data in a structured format is extracted. For example, a vendor entity, a date entity, a credit card entity and a total amount entity may be extracted from a receipt/invoice and structured entity data, date data, credit card data and total amount data may be extracted.

Figure 6:
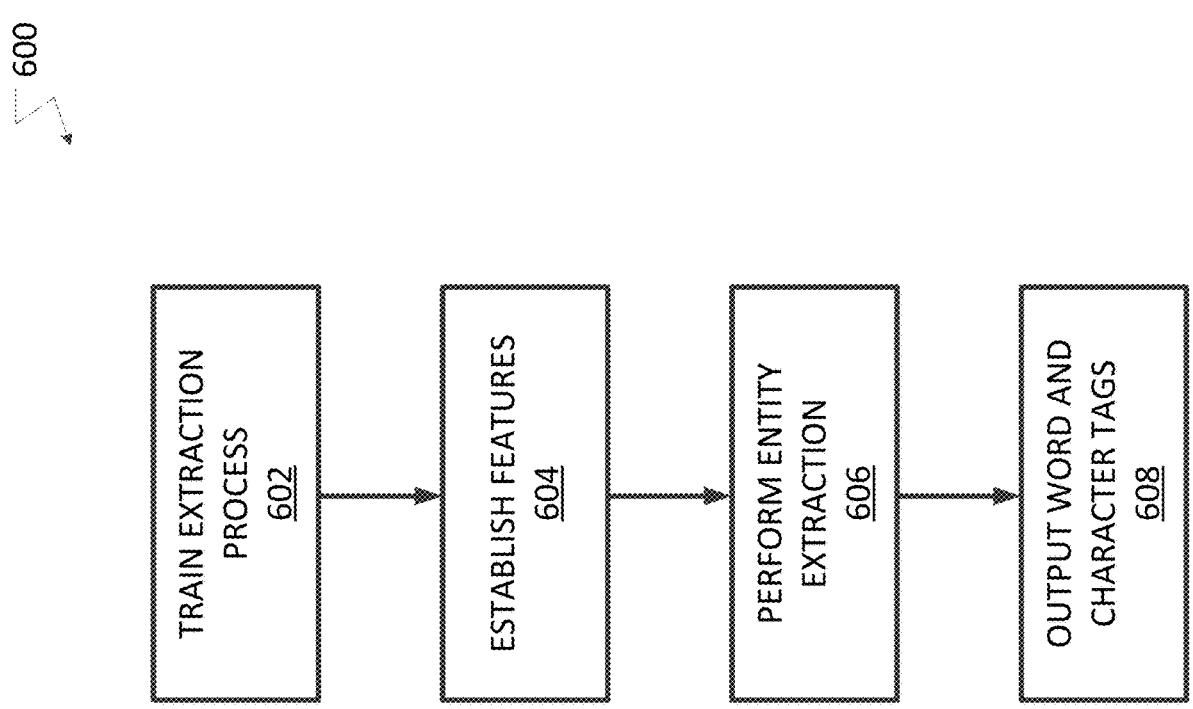
FIG. 6 illustrates a method for named entity recognition extraction.

FIG. 6 illustrates a method 600 for named entity recognition extraction. The method 600 may be used for various pieces of content and may be implemented using the system and computer system shown in FIGS. 11 and 12 described below. The method can be used for extracting entities from a receipt as described above in which the extracting process may be implemented as a novel character level machine learning bi-directional long short-term memory conditional random field (BiLSTM-CRF) process in which the CRF model predicts the likelihood of entity type at the character level of the input texts. A machine learning BiLSTM-CRF process used for words is known and is described in Lin et al., "Multi-channel BiLSTM-CRF Model for Emerging Named. Entity Recognition in Social Media" In *Proceedings of the* 3*rd Workshop on Noisy User-generated Text*, pp. 160-165 (2017) that is incorporated herein by reference. The method 600 also can be used for extracting entities from a form, such as a tax form, as described above.

The known machine learning BiLSTM-CRF process uses a comprehensive word representation to transform input words into continuous vector representations, which are then concatenated and fed into a neural network. This comprehensive representation consisting of character-level word embeddings combined with handcrafted word features (POS tags, dependency roles, word positions, and head positions). However, this known method requires a large amount of high quality labeled data to train which is expensive to acquire for pieces of content like receipts and forms. Thus, the method 600 uses a novel BiLSTM-CRF process that does not require high quality labeled data and is able to extract entities for both receipts and forms.

Figure 7:
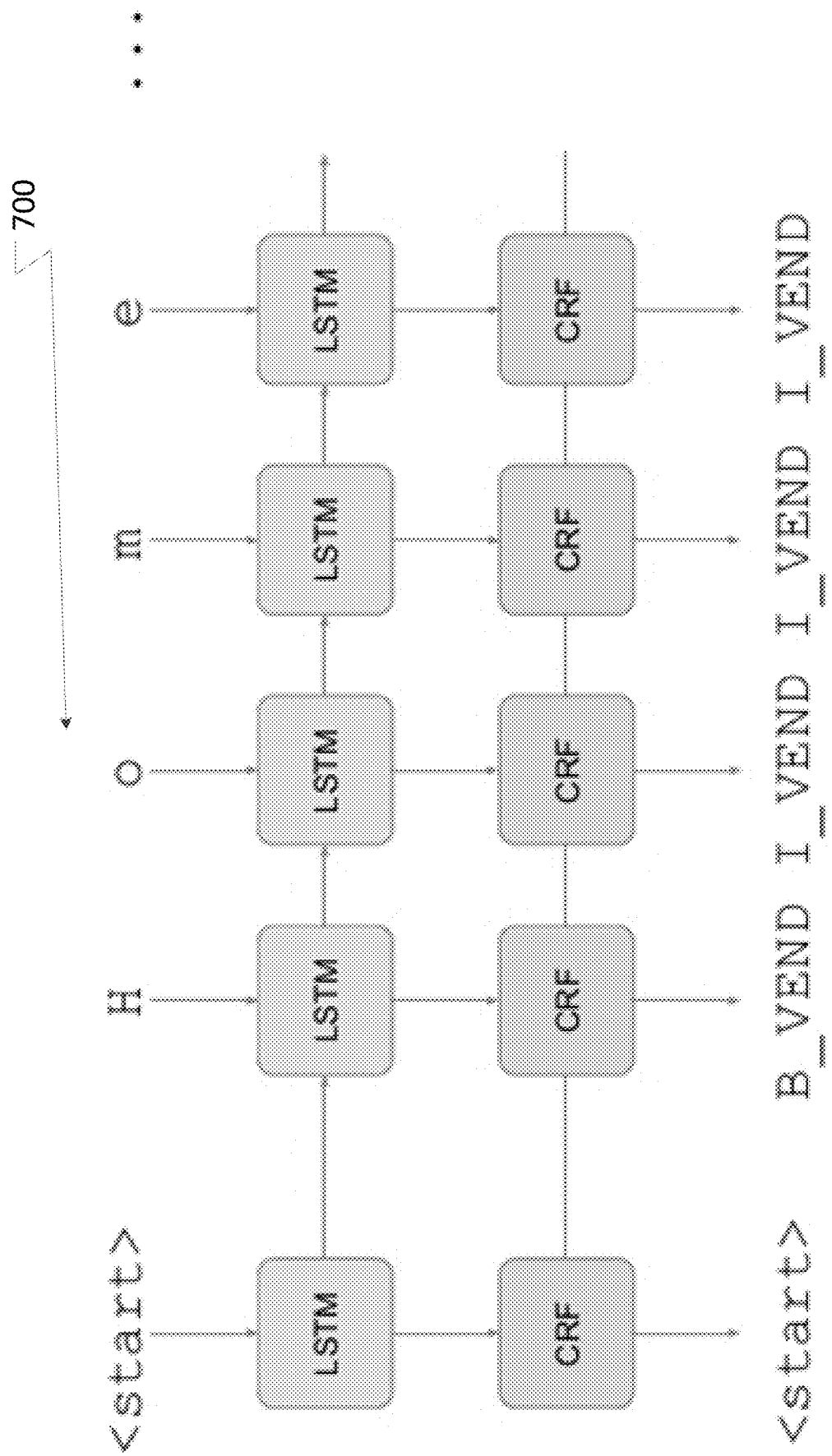
FIG. 7 illustrates an example of a named entity recognition extraction process and the results of that process.

The method 600, in one embodiment, may be used for the receipts/invoices to extract the entities described above using character level data extraction and is important for a few main reasons 1) text derived from OCR contains character-level translation errors which would expand the set of known entities to be far too large; and 2) text in receipts contains abbreviations and shortened words that are uncommon in most natural language texts. Furthermore, receipts are much less structured than forms, and there could be a variety of unfamiliar, infrequent, or new words within them. To minimize the effect of error prone OCR text and infrequent words, the method thus employs character level input streams to the biLSTM-CRF model and subsequently predicts relevant entity tags in the sequence at the character level. To differentiate words, the method 600 leverages the BIO tagging scheme, and the CRF learns to identify the Beginning (begin-of-entity), the Inside (continuation of-entity) and the Outside (no entity) of the text segments (an example of which is shown in FIG. 7 and described below).

The method 600 starts by training the extraction process 602 in a known manner. To create training data at character level and tag them properly, the training process 602 uses matching techniques to match OCRed text against the ground truth data, and some heuristic clue words (based on prior knowledge on receipts). Generally a tagged entity is identified when the ground truth entity is detected as a substring within the main OCRed text using a sliding window comparison and edit distance threshold. For example, an input to the extraction process, for a receipt, may be a list of the known vendors at known locations (based on training and prior knowledge, so that the extraction process may use that list to try to match the extracted vendor entities to the known vendors. As another example, also in the context of a receipt, a heuristic pattern may be that a string of digits followed by a period and then two more digits (XXXX.YY) is likely an amount of money on the receipt and that heuristic can be used to assist in the identification of the amount of the receipt entity.

After the creation of the training data, the training process 602 trains the biLSTM-CRF model employed through standard gradient descent techniques known in industry. Specifically the process passes through text sequence data and calculates a most probable sequence of tags in a forward pass. It then calculates the discrepancy between the predicted sequence of tags and known ground truth sequence and uses the calculated error between the two as a means for gradient backpropagation. The calculated gradients are then used to update the model parameters in an iterative fashion until a fully trained set of parameters is eventually converged upon.

Once trained, the method 600 may establish features 604 for the entity extraction. In addition to raw characters, the method may also benefit from additional features, which can be divided into three categories. The first category are word embeddings namely Stanford GloVe embeddings (trained on 6 billion words from Wikipedia and Web text and described in more detail at nlp.stanford.edu/projects/glove/ that is incorporated herein by reference) and Google's word2vec embeddings (trained on 100 billion words from Google News and described in more detail at code.google.com/archive/p/word2vec/ that is incorporated herein by reference.) A second category are token-level features such as POS Tagging, Capitalization and spelling features. A third category may be spatial features such as relative position of characters and words. In one embodiment, the word, spelling and context features are inputs to the data extracting process.

The method 600 may then perform the character level entity extraction 606 using the training data and the features described above. The entity extracting may utilize a character level BiLSTM-CRF process. The results of the entity extracting process may be output (608) as tagged entity words and characters.

FIG. 7 illustrates an example of a named entity recognition extraction process that can be used to extract the structure data at the character level. In this example, the extracting process is the character level machine learning named entity recognition bi-directional long short-term memory conditional random field (BiLSTM-CRF) process. In the example in FIG. 7, word level entity extracting has already been performed and then the character level extraction is performed in which the characters (start delimiter, H, o, m, e) are part of the input stream of characters that pass through an LSTM process and a CRF process. In this example, the characters being processed are believed to be part of a vendor name entity that is one of the entities being extracted for receipts. In the example, the start delimiter is extracted as a start entity and a first character of the word ("H") is recognized as an entity "B_VEND" which indicates that the character is recognized as being the beginning character in a vendor name. Subsequent characters in the word are recognized as a I_VEND character entity indicating that the character is recognized as a middle character of the same vendor entity. In this manner, the method is able to better extract entities of interest because the character level data extraction is less likely to incorrectly identify the characters even with the translation errors.

Figure 8:
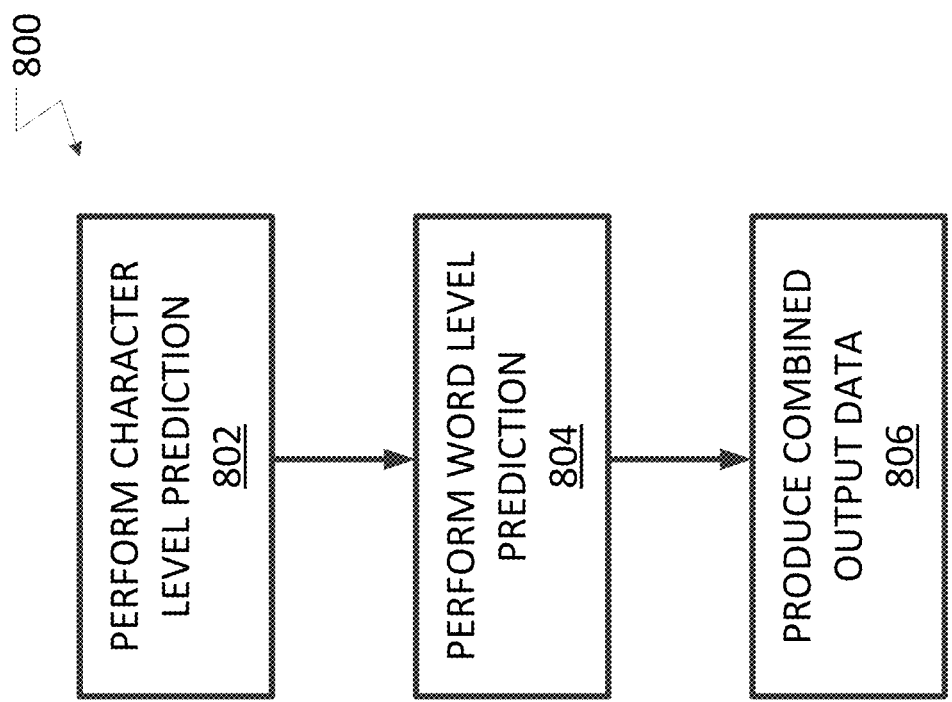
FIG. 8 illustrates another embodiment of the named entity recognition extraction process.

FIG. 8 illustrates another embodiment of the named entity recognition extraction process 800 that may include both character level prediction and word level extraction. This process 800 may be used for various pieces of content and may be implemented using the system and computer system shown in FIGS. 11 and 12 described below. The process, as above, is robust to text translation errors due to the character level extraction and prediction. In this process, the output text stream from an optical character recognition process may be subjected to a character level prediction process 802 that featurizes the text stream at the character level. This process, as described in more detail below with reference to FIG. 9, processes the text stream through a known BiLSTM process as described above to generate a resultant feature vector, The feature vector may be input to a known CRF process to make predictions about the entity labels for each character as described above. Thus, this process 802 works by assigning specific entity labels to each character so that each character is labeled as relevant to a given piece of information (like the total amount or parts of the vendor name shown in the example in FIG. 7) or labeled as irrelevant.

The process 800 may then perform a word level prediction 804 that uses the BiLSTM and CRF processes to classify words in the text stream into different entity labels, such as vendor name or total amount. More details of the word level prediction are described below with reference to FIG. 10. The results of the word level prediction, like the character level prediction, are words with labels for certain information and a label for irrelevant words. The words and characters categorized as irrelevant may then be discarded and ignored during later processing of the data or when the structured data is used in subsequent processes. Once the character level and word level predictions (802, 804) are completed, the method may combine the word level and character level predictions (806) to generate an output. For example, the output may be the structured data for a receipt as shown in FIG. 5.

Figure 9:
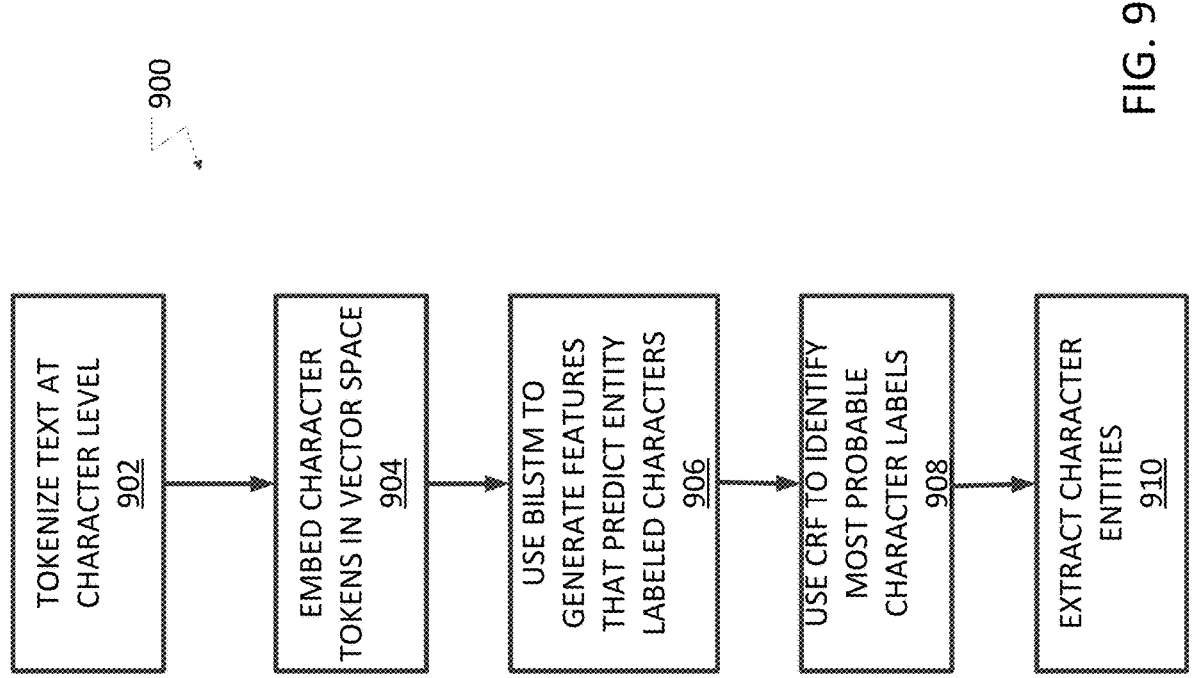
FIG. 9 illustrates more details of the character level extracting process in FIG. 8.

FIG. 9 illustrates more details of the character level extracting process 900 in FIG. 8. The process may begin with tokenizing (902) of the text in the text stream at a character level. The results of this process may be a sequence of tokens wherein characters are translated into numerical token values. For example the input stream "3 packages, mushroom 3×3.99" may be translated into the token stream [7, 3, 29, 14, 16, 24, 14, 20, 18, 32, 77, 3, 26, 34, 32, 21, 31, 28, 28, 26, 3, 7, 3, 37, 3, 7, 79, 13, 13] The tokens may then be embedded (904) within a vector space using trained embeddings as is known in the machine learning space. The sequence of character embeddings may be input to the BiLSTM process (906) to generate a sequence of features that predict a probability that each character being labeled as of a specific entity type, an example of which as shown in FIG. 7. The results from the BiLSTM process may be fed into the known CRF process (908) that uses the probabilities from the BiLSTM process to generate a most probable set of sequence labels. The most probable set of labels may be used to extract the entities for each relevant information label along with character sequences that correspond with the predicted labels (910). For example, in the input string "Jimmy's Pizza 3099 N. First St. . . . " the model would produce a sequence of tags such that the beginning and continuation of an entity of interest is labeled as in [B_VEND, I_VEND, I_VEND, . . . ]. Once these tags have been assigned, extraction of the character level entities involves concatentating character sequences which have the proper predicted entity tags. This process is thus robust to character level errors as the joint biLSTM-CRF system learns common character errors and is capable of decoding the proper tag sequence even in the case of one-off translation issues like "L" being mistranslated as a "1" as discussed previously.

Figure 10:
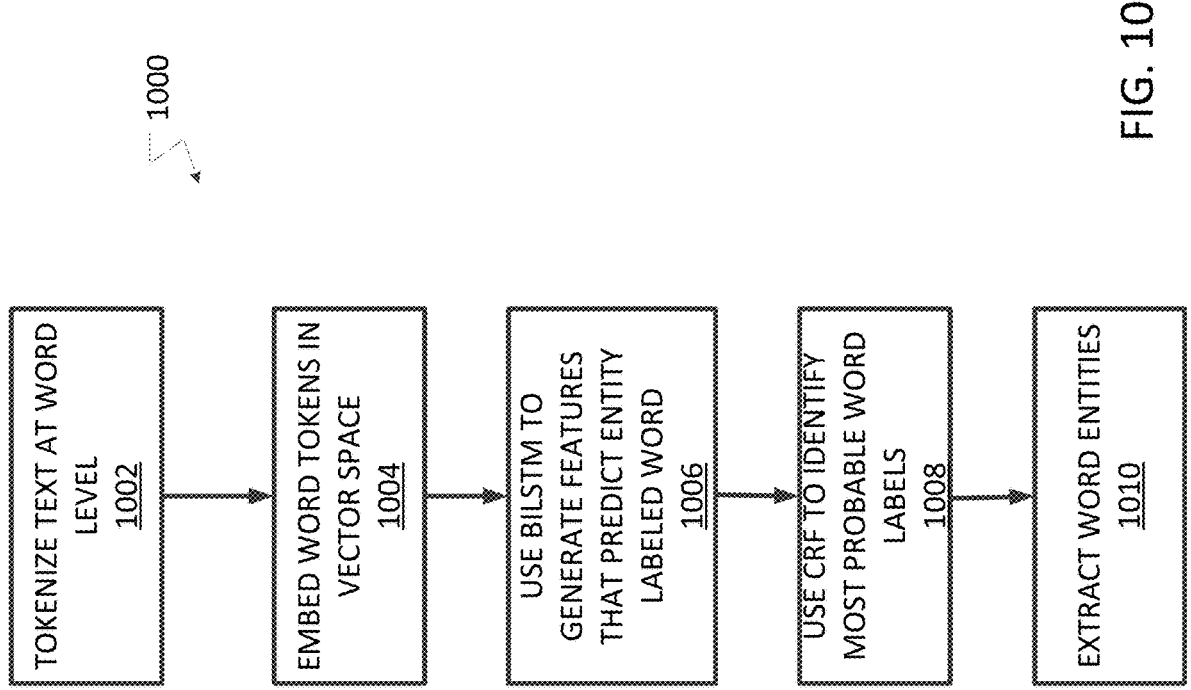
FIG. 10 illustrates more details of the word level extracting process in FIG. 8.

FIG. 10 illustrates more details of the word level extracting process 1000 in FIG. 8. The process may begin with a tokenizing (902) of the text in the text stream at a word level with spatial information. The results of the this process may be a sequence of words. The process may then embed the words (1004) within a vector space using trained embeddings as is known in the machine learning space, so that each word corresponds to a unique set of numbers over a specified number of dimensions. The process may then concatenate the spatial information vector and word embedding vector that are input to a word level BiLSTM process (1006) to generate a sequence of features predicting a probability of each word being labeled for each entity. The process may input the feature vector from the BiLSTM into the CRF process (1008) to generate a list of most probable word labels and the most probable set of labels may be used to extract the entities for each relevant information label along with character sequences that correspond with the predicted labels (1010).

Figure 11:
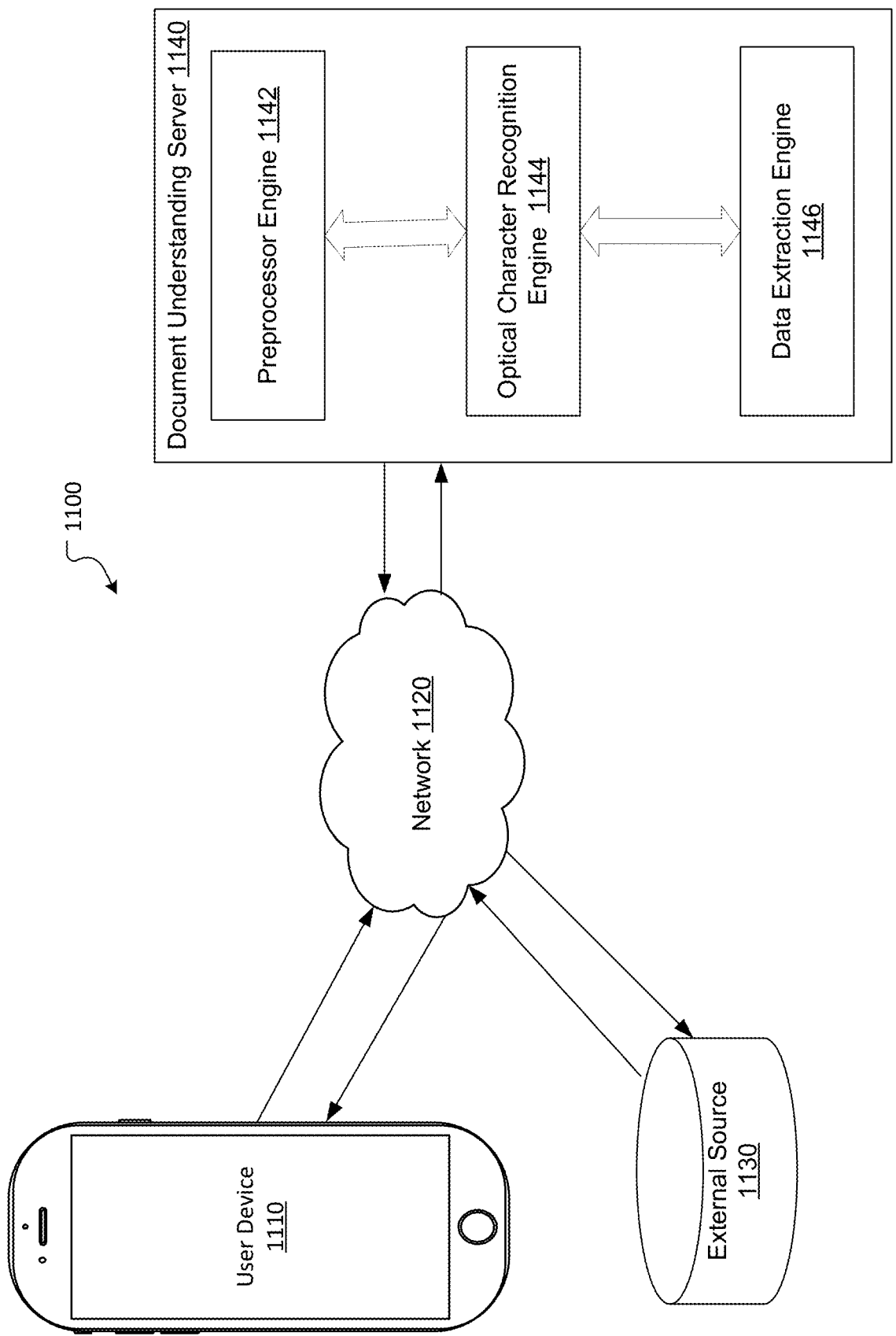
FIG. 11 illustrates an document understanding system according to an embodiment of the present disclosure.

FIG. 11 illustrates a document understanding system 1100 according to an embodiment of the present disclosure. The system 1100 may include elements such as at least one client 1110, an external source 1130 and a document understanding platform 1140 with a preprocessing engine 1142, optical character recognition engine 1144 and a data extraction engine 1146. Each of these elements may include one or more physical computing devices (e.g., which may be configured as shown in FIG. 2). In some embodiments, one physical computing device may provide at least two of the elements, for example the preprocessing engine 1142, the optical character recognition engine 1144 and the data extraction engine 1146 may be provided by a single computing device. In some embodiments, client 1110 may be any device configured to provide access to services. For example, client 1110 may be a smartphone, personal computer, tablet, laptop computer, or other device. In some embodiments, the document understanding platform 1140 may be any device configured to host a service, such as a server or other device or group of devices. In some embodiments, client 1110 may be a service running on a device, and may consume other services as a client of those services (e.g., as a client of other service instances, virtual machines, and/or servers).

The elements may communicate with one another through at least one network 1120. Network 1120 may be the Internet and/or other public or private networks or combinations thereof. For example, in some embodiments, at least the external source 1130 and document understanding server 1140 (and its elements) may communicate with one another over secure channels (e.g., one or more TLS/SSL channels). In some embodiments, communication between at least some of the elements of system 1000 may be facilitated by one or more application programming interfaces (APIs). APIs of system 1000 may be proprietary and/or may be examples available to those of ordinary skill in the art such as Amazon® Web Services (AWS) APIs or the like.

Specific examples of the processing performed by the elements of system 1100 in combination with one another are provided above. As described above, the client 1110 may attempt to access a service provided by the document understanding server 1140 that may include one or more different document understanding processes. As described above, the goal of the document understanding processes is extract data/text from an input piece of content wherein the input piece of content may be a receipt/invoice or a tax form that may be received from the client device 1110. In some embodiments, the client device 1110 may scan the piece of content, such as by using a camera device build into the client device 1110 and provide the scanned piece of content to the document understanding server 1140. The client 1110, external source 1130 and document understanding server 1140 are each depicted as single devices for ease of illustration, but those of ordinary skill in the art will appreciate that client 1110, external source 1130 and document understanding server 1140 may be embodied in different forms for different implementations. For example, any of client 1110, external source 1130 and document understanding server 1140 may include a plurality of devices, may be embodied in a single device or device cluster, and/or subsets thereof may be embodied in a single device or device cluster. In another example, a plurality of clients 1110 may be connected to network 1120. A single user may have multiple clients 1110, and/or there may be multiple users each having their own client(s) 1110. Client(s) 1110 may each be associated with a single process, a single user, or multiple users and/or processes. Furthermore, as noted above, network 1120 may be a single network or a combination of networks, which may or may not all use similar communication protocols and/or techniques.

Figure 12:
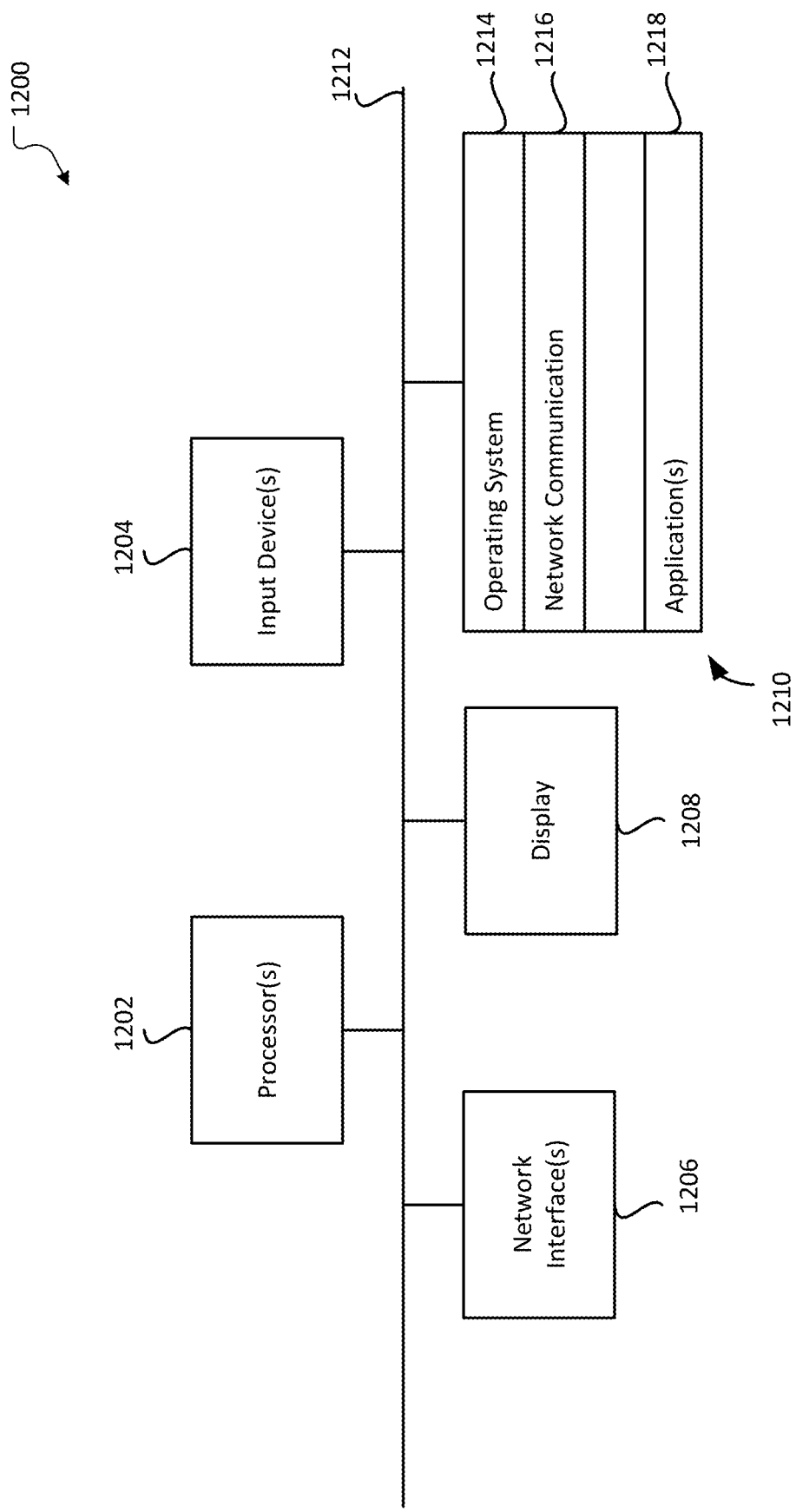
FIG. 12 illustrates a computing device according to an embodiment of the present disclosure.

FIG. 12 is a block diagram of an example computing device 1200 that may implement various features and processes as described herein. For example, computing device 1200 may function as client 1110, the external source 1130, the document understanding system 1140, or a portion or combination of any of these elements. In some embodiments, a single computing device 1200 or cluster of computing devices 1200 may provide each of the external source 1130, the document understanding system 1140, or a combination of two or more of these services. Computing device 1200 may be implemented on any electronic device that runs software applications derived from instructions, including without limitation personal computers, servers, smart phones, media players, electronic tablets, game consoles, email devices, etc. In some implementations, computing device 1200 may include one or more processors 1202, one or more input devices 1204, one or more network interfaces 1206, one or more display devices 1208, and one or more computer-readable mediums 1210. Each of these components may be coupled by bus 1212, and in some embodiments, these components may be distributed across multiple physical locations and coupled by a network.

Display device 1208 may be any known display technology, including but not limited to display devices using Liquid Crystal Display (LCD) or Light Emitting Diode (LED) technology. Processor(s) 1202 may use any known processor technology, including but not limited to graphics processors and multi-core processors. Input device 1204 may be any known input device technology, including but not limited to a keyboard (including a virtual keyboard), mouse, track ball, and touch-sensitive pad or display. Bus 1212 may be any known internal or external bus technology, including but not limited to ISA, EISA, PCI, PCI Express, NuBus, USB, Serial ATA or FireWire. Computer-readable medium 1210 may be any medium that participates in providing instructions to processor(s) 1202 for execution, including without limitation, non-volatile storage media (e.g., optical disks, magnetic disks, flash drives, etc.), or volatile media (e.g., SDRAM, ROM, etc.).

Computer-readable medium 1210 may include various instructions 1214 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 1204; sending output to display device 1208; keeping track of files and directories on computer-readable medium 1210; controlling peripheral devices (e.g., disk drives, printers, etc.) which can be controlled directly or through an I/O controller; and managing traffic on bus 1212. Network communications instructions 1216 may establish and maintain network connections (e.g., software for implementing communication protocols, such as TCP/IP, HTTP, Ethernet, telephony, etc.).

Application instructions 1218 may include instructions that perform the various document understanding functions as described herein. The application instructions 1218 may vary depending on whether computing device 1200 is functioning as client 1110 or the document understanding system 1140, or a combination thereof. Thus, the application(s) 1218 may be an application that uses or implements the processes described herein and/or other processes. The processes may also be implemented in operating system 1214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other, or by processes running on the same device and/or device cluster, with the processes having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As the foregoing description illustrates, the disclosed systems and methods may provide centralized authentication and authorization of clients 120 for accessing remote services based on a variety of policies. For example, the same central authority 130 may validate different clients 120 for different services based on different policies. The elements of the system (e.g., central authority 130, client 120, and/or service provider 150) may be policy-agnostic (e.g., the policy may specify any terms and may even change over time, but the authentication and authorization may be performed similarly for all policies). This may result in an efficient, secure, and flexible authentication and authorization solution. Moreover, this may result in a flattening of communications between client 120 and service provider 150 (e.g., because service provider 150 and client 120 may not be required to exchange several authentication and authorization messages between one another) while still allowing for trustworthy authentication and authorization.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for extracting data, the method comprising:
receiving a stream of text from a piece of content the stream of text being received from an optical character recognition process;
assigning, using a machine learning information extraction process executed by a processor of the computer, an entity label to each alphanumeric character a stream of text, the entity label providing a character level prediction of a relevance of each alphanumeric character to a piece of content, wherein the stream of text is an output from an optical character recognition process on the piece of content; and
extracting, by the processor of the computer, one or more pieces of structured data from the piece of content based on the assigned alphanumeric character entity labels.

2. The method of claim 1, wherein assigning the entity label to each alphanumeric character further comprises performing a machine learning bi directional long short term memory executed by the processor of the computer to generate a plurality of features that each predict a probability that a particular alphanumeric character corresponds to a particular entity label.

3. The method of claim 2, wherein assigning the entity label to each alphanumeric character further comprises performing a machine learning conditional random field by the processor of the computer to generate a plurality of character entity labels based on the probability that a particular alphanumeric character corresponds to a particular entity label.

4. The method of claim 3, wherein assigning the entity label to each alphanumeric character further comprises training the machine learning information extraction process.

5. The method of claim 4, wherein training the machine learning information extraction process further comprises applying a heuristic rule that trains the machine learning information extraction process.

6. The method of claim 1 further comprising assigning, using a machine learning information extraction process executed by a processor of the computer, an entity label to each word in the stream of text.

7. The method of claim 1, wherein the piece of content further comprises an image of the piece of content and the piece of content further comprises one of a receipt and a tax form.

8. The method of claim 7 further comprising generating, by a camera of a computing device, the image of the piece of content.

9. The method of claim 1, wherein the entity label further comprises one of a beginning alphanumeric character in a word and a middle alphanumeric character of the word.

10. The method of claim 1, wherein extracting one or more pieces of structured data from the piece of content based on the assigned character entity labels further comprises using a bidirectional long short term memory machine learning model to extract the one or more pieces of structured data.

11. An apparatus, comprising:
a computer based document understanding platform having a processor that executes a plurality of lines of instructions and configured to:
receive a stream of text from a piece of content the stream of text being received from an optical character recognition process;
assign, using a machine learning information extraction process an entity label to each alphanumeric character in a stream of text, the entity label providing a character level prediction of a relevance of each alphanumeric character to a piece of content, wherein the stream of text is an output from an optical character recognition process on the piece of content; and
extract one or more pieces of structured data from the piece of content based on the assigned alphanumeric character entity labels.

12. The apparatus of claim 11, wherein the processor is further configured to perform a machine learning bi directional long short term memory to generate a plurality of features that each predict a probability that a particular alphanumeric character corresponds to a particular entity label.

13. The apparatus of claim 12, wherein the processor is further configured to perform a machine learning conditional random field by the processor of the computer to generate a plurality of character entity labels based on the probability that a particular alphanumeric character corresponds to a particular entity label.

14. The apparatus of claim 13, wherein the processor is further configured to train the machine learning information extraction process.

15. The apparatus of claim 14, wherein the processor is further configured to apply a heuristic rule that trains the machine learning information extraction process.

16. The apparatus of claim 11, wherein the processor is further configured to assign, using a machine learning information extraction process executed by a processor of the computer, an entity label to each word in the stream of text.

17. The apparatus of claim 11, wherein the piece of content further comprises an image of the piece of content and the piece of content further comprises one of a receipt and a tax form.

18. The apparatus of claim 17 further comprising a computing device having a camera connected to the document understanding platform, wherein the camera captures the image of the piece of content.

19. The apparatus of claim 11, wherein the entity label further comprises one of a beginning alphanumeric character in a word and a middle alphanumeric character of the word.

20. The apparatus of claim 11, the processor is further configured to use a bidirectional long short term memory machine learning model to extract the one or more pieces of structured data.

* * * * *